US009393686B1

(12) United States Patent
Bradski et al.

(10) Patent No.: US 9,393,686 B1
(45) Date of Patent: Jul. 19, 2016

(54) MOVEABLE APPARATUSES HAVING ROBOTIC MANIPULATORS AND CONVEYORS TO FACILITATE OBJECT MOVEMENT

(71) Applicant: Industrial Perception Inc., Mountain View, CA (US)

(72) Inventors: Gary Bradski, Palo Alto, CA (US); Steve Croft, Scotts Valley, CA (US); Kurt Konolige, Menlo Park, CA (US); Ethan Rublee, Mountain View, CA (US); Troy Straszheim, Palo Alto, CA (US); John Zevenbergen, San Francisco, CA (US)

(73) Assignee: Industrial Perception, Inc., Mountain View, CA (US)

( * ) Notice: Subject to any disclaimer, the term of this patent is extended or adjusted under 35 U.S.C. 154(b) by 215 days.

(21) Appl. No.: 14/213,300

(22) Filed: Mar. 14, 2014

Related U.S. Application Data

(60) Provisional application No. 61/793,151, filed on Mar. 15, 2013, provisional application No. 61/798,425, filed on Mar. 15, 2013, provisional application No. 61/798,564, filed on Mar. 15, 2013, provisional application No. 61/798,505, filed on Mar. 15, 2013.

(51) Int. Cl.
*G06F 7/00* (2006.01)
*G06F 19/00* (2011.01)
(Continued)

(52) U.S. Cl.
CPC .................. *B25J 5/00* (2013.01); *B65G 41/008* (2013.01); *Y10S 901/02* (2013.01)

(58) Field of Classification Search
CPC ............... B65G 47/842; B65G 17/323; B65G 2201/0244; B65G 2201/0247; B65G 41/002
See application file for complete search history.

(56) References Cited

U.S. PATENT DOCUMENTS 4,831,549 A  5/1989 Red et al.
5,541,485 A  7/1996 Teichmann et al.
(Continued)

FOREIGN PATENT DOCUMENTS

DE    10324755   9/2004
EP    2156927    2/2010
(Continued)

OTHER PUBLICATIONS

Agarwal, Sameer, Mierle, Keir, and others: Ceres Solver. http://code.google.com/p/ceres-solver, last accessed Apr. 22, 2014, 2 pages.
(Continued)

*Primary Examiner* — Yolanda Cumbess
(74) *Attorney, Agent, or Firm* — McDonnell Boehnen Hulbert & Berghoff LLP

(57) ABSTRACT

Example embodiments provide for robotic apparatuses that facilitate moving objects within an environment, such as to load or unload boxes or to construct or deconstruct pallets (e.g., from a container or truck bed). One example apparatus includes a horizontal conveyor and a robotic manipulator that are both provided on a moveable cart. A first end of the robotic manipulator is mounted to the moveable cart and a second end of the robotic manipulator has an end effector, such as a grasper. The apparatus also includes a control system configured to receive sensor data indicative of an environment containing a plurality of objects, and then cause the robotic manipulator to place an object from the plurality of objects on the horizontal conveyor.

23 Claims, 14 Drawing Sheets

(51) Int. Cl.
*B25J 5/00* (2006.01)
*B65G 41/00* (2006.01)

(56) References Cited

U.S. PATENT DOCUMENTS

| | | | |
|---|---|---|---|
| 5,992,751 | A | 11/1999 | Laser |
| 6,442,920 | B1 * | 9/2002 | Peterson ............... A01D 46/26 56/328.1 |
| 6,493,607 | B1 | 12/2002 | Bourne et al. |
| 7,099,745 | B2 | 8/2006 | Ebert |
| 7,587,082 | B1 | 9/2009 | Rudin et al. |
| 7,818,091 | B2 | 10/2010 | Kazi et al. |
| 7,854,108 | B2 * | 12/2010 | Koselka ................ A01D 6/30 56/10.2 A |
| 7,957,583 | B2 | 6/2011 | Boca et al. |
| 7,967,543 | B2 | 6/2011 | Criswell et al. |
| 8,108,072 | B2 | 1/2012 | Zhao et al. |
| 8,229,595 | B2 | 7/2012 | Seelinger et al. |
| 8,286,877 | B2 | 10/2012 | Olmstead |
| 8,306,314 | B2 | 11/2012 | Tuzel et al. |
| 8,306,663 | B2 | 11/2012 | Wickham |
| 8,360,318 | B2 | 1/2013 | Reynolds et al. |
| 8,379,014 | B2 | 2/2013 | Wiedemann et al. |
| 8,411,929 | B2 | 4/2013 | Silver |
| 8,600,161 | B2 | 12/2013 | Simon et al. |
| 2002/0150450 | A1 | 10/2002 | Bevirt et al. |
| 2008/0279446 | A1 | 11/2008 | Hassebrook et al. |
| 2008/0300723 | A1 | 12/2008 | Ban et al. |
| 2009/0118864 | A1 | 5/2009 | Eldridge et al. |
| 2010/0092267 | A1 | 4/2010 | Najdovski et al. |
| 2010/0286827 | A1 | 11/2010 | Franzius et al. |
| 2011/0320039 | A1 | 12/2011 | Hsu et al. |
| 2012/0095322 | A1 | 4/2012 | Tsekos et al. |
| 2012/0239194 | A1 | 9/2012 | Kagawa |
| 2012/0294510 | A1 | 11/2012 | Zhang et al. |
| 2013/0010081 | A1 | 1/2013 | Tenney et al. |
| 2013/0041508 | A1 | 2/2013 | Hu et al. |
| 2013/0147944 | A1 | 6/2013 | Zhang et al. |
| 2013/0151007 | A1 | 6/2013 | Valpola et al. |
| 2013/0335535 | A1 | 12/2013 | Kane et al. |
| 2013/0345870 | A1 | 12/2013 | Buehler et al. |
| 2014/0012415 | A1 | 1/2014 | Benaim et al. |
| 2014/0019392 | A1 | 1/2014 | Buibas |

FOREIGN PATENT DOCUMENTS

| | | |
|---|---|---|
| WO | 2007/050776 | 5/2007 |
| WO | 2013/065003 | 5/2013 |

OTHER PUBLICATIONS

Curless, Brian et al., "A Volumetric Method for Building Complex Models from Range Images," Proceedings of the 23rd annual conference on Computer Graphics and Interactive Techniques, ACM, New York, New York, Aug. 4-9, 1996, pp. 303-312.

Davis, James et al., "Spacetinne Stereo: A Unifying Framework for Depth from Triangulation," IEEE Transactions on Pattern Analysis and Machine Intelligence, Feb. 2005, pp. 296-302, vol. 27, No. 2.

Greene, D. H., "The decomposition of polygons into convex parts," in Computational Geometry, ser. Adv. Comput. Res., F. P. Preparata, Ed. Greenwich, CT: JAI Press, 1983, pp. 235-259, vol. 1.

Hoppe, H. et al., Surface Reconstuction from Unorganized Points, Computer Graphics (SIGGRAPH'92 proceedings), Jul. 1992, pp. 71-78, vol. 26, No. 2.

Jimenez, P. et al., "3D Collision Detection: a Survey," Computers & Graphics, 2001, pp. 269-285, vol. 25, No. 2.

John, J. Craig. "Introduction to robotics: mechanics and control," Addison-Wesley Publishing Company, Inc., Reading, MA, 1989, Chapters 3, 4 and 7, pp. 68-151 and 227-261.

Konolige, Kurt, "Projected Texture Stereo," Proceedings of the 2010 IEEE International Conference on Robotics and Automation (ICRA), May 3-7, 2010, p. 148-155.

Kuffner, J. "RRT-connect: An Efficient Approach to Single-Query Path Planning", IEEE International Conference on Robotics and Automation, 2000, pp. 1-7.

Lorensen et al., "Marching Cubes: A High Resolution 3D Surface Construction Algorithm," Computer Graphics, Jul. 1987, p. 163-169, vol. 21, No. 4.

Marns, Jack, Automated robotic truck loader optimizes shipping space, Smart Packaging, Jan. 1, 2012, http:// www.packagingdigest.com/smart-packaging/automated-robotic-truck-loader-optimizes-shipping-space.

Newcombe et al., "KinectFusion: Real-Time Dense Surface Mapping and Tracking," Proceedings of the 2011 10th IEEE International Symposium on Mixed and Augmented Reality, IEEE Computer Society, Washington, DC, 2011, p. 127-136.

Nießner, M. et al., "Real-time 3D Reconstruction at Scale using Voxel Hashing," ACM Transactions on Graphics (TOG), 2013.

Okutomi et al., "A Multiple-Baseline Stereo," IEEE Transactions on Pattern Analysis and Machine Intelligence, Apr. 1993, pp. 353-363, vol. 15, No. 4.

Schulman, John et al., "Finding Locally Optimal, Collision-Free Trajectories with Sequential Convex Optimization," Robotics: Science and Systems (RSS), 2013, 10 pages.

Tsai et al., "A Single-Pixel Wireless Contact Lens Display," IEEE Transactions on Robotics and Automation, 1989, pp. 345-358.

* cited by examiner

US 9,393,686 B1

MOVEABLE APPARATUSES HAVING ROBOTIC MANIPULATORS AND CONVEYORS TO FACILITATE OBJECT MOVEMENT

CROSS REFERENCE TO RELATED APPLICATION

The present application claims priority to U.S. Provisional patent application Ser. No. 61/793,151 filed on Mar. 15, 2013 and entitled "Mixed Case Palletizing and Truck Loading/Unloading," U.S. Provisional patent application Ser. No. 61/798,425 filed on Mar. 15, 2013 and entitled "Environment Reconstruction and Trajectory Planning," U.S. Provisional patent application Ser. No. 61/798,564 filed on Mar. 15, 2013 and entitled "Object Reconstruction and Detection," and U.S. Provisional patent application Ser. No. 61/798,505 filed on Mar. 15, 2013 and entitled "Optical Sensors," which are each herein incorporated by reference as if fully set forth in this description.

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic apparatus may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present disclosure provides apparatuses that facilitate object unloading and loading. An apparatus may include a moveable cart, a conveyor provided on the moveable cart, and a robotic manipulator mounted to the moveable cart. The apparatus may also include a control system configured to cause the robotic manipulator to place objects on the conveyor. For instance, the robotic manipulator may pick up objects and place them on the conveyor. The conveyor may provide locomotion that causes the object to move along the conveyor.

In one example, an apparatus is provided that includes a moveable cart, a horizontal conveyor provided on the moveable cart that includes a first segment providing locomotion in a first direction, and a second segment coupled to and vertically aligned with the first segment and providing locomotion in a second direction away from the first segment, and a robotic manipulator having a first end mounted to the moveable cart and a second end having an end effector. The apparatus also include a control system configured to receive sensor data indicative of an environment containing a plurality of objects; and cause the robotic manipulator to place an object from the plurality of objects on the horizontal conveyor.

In a further example, an apparatus is provided that includes a moveable cart, a horizontal conveyor provided on the moveable cart, a first robotic manipulator mounted to the moveable cart, and a second robotic manipulator mounted to the moveable cart. The apparatus also includes a control system configured to receive sensor data indicating an environment containing a plurality of objects, cause the first robotic manipulator to place an first object from the plurality of objects on the conveyor; and cause the second robotic manipulator to place an second object from the plurality of objects on the conveyor.

In another example, an apparatus is provided that includes a moveable cart, and a conveyor provided on the moveable cart. The conveyor includes a frame, a roller rotatably coupled to the frame, where the roller includes an volume and a plurality of openings to the volume, an air pump, a hose coupled between the volume of the roller and the air pump, and a conveyor belt having a plurality of openings that is wrapped around an exterior side of the roller, where at least a portion of the plurality of holes in the conveyor belt align with at least a portion of the plurality of holes of the roller. The apparatus also includes an actuator coupled between the moveable cart and the frame of the conveyor. The apparatus includes a control system configured to receive sensor data indicating an environment containing a plurality of objects, cause the actuator to bring the conveyor belt in contact with an object from the plurality of objects, cause the pump to apply a negative pressure to the interval volume of the roller to engage the object by suction, and cause the conveyor belt to rotate around the roller toward the moveable cart to place the object on the conveyor belt.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
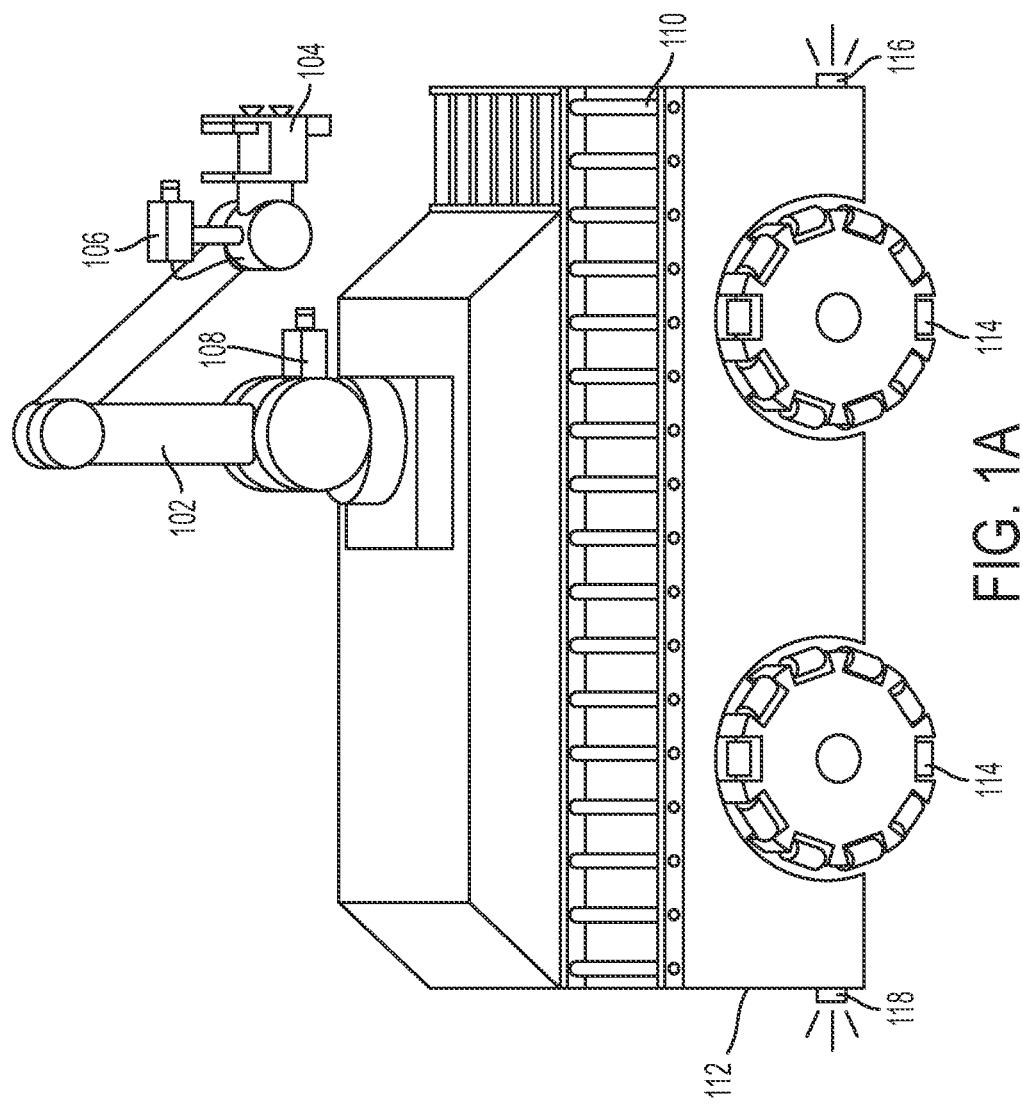
FIG. 1A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments provide for robotic apparatuses that facilitate moving objects within an environment, such as to load or unload boxes or to construct or deconstruct pallets (e.g., from a container or truck bed). An example apparatus may include a moveable cart, a robotic manipulator (e.g. a robotic arm) mounted to the moveable cart, and a horizontal conveyor provided on the moveable cart. The apparatus may also include a control system that causes the robotic manipulator to place an object on the conveyor. The conveyor may then provide locomotion that causes the object to move along the conveyor. Ultimately the object may pass from the conveyor. For instance, the conveyor may pass the object to a pallet or to another conveyor.

Certain arrangements of the robotic manipulator and the horizontal conveyor may reduce the time involved in moving each object within the environment, so as to hasten the loading or unloading of boxes, for example. Some arrangements may involve less movement of the robotic manipulator in moving each object. Further, some arrangements may allow parallelization of certain aspects of object movement. Other arrangements may reduce the time involved in positioning the apparatus to move objects. Additional or alternative advantages from the arrangements disclosed herein may be realized as well.

One example arrangement may include a horizontal conveyor and a robotic manipulator that are each provided on a moveable cart. The horizontal conveyor may have a first and a second segment. The first segment may be mounted at a first end of the moveable cart (e.g. the front of the moveable cart). In operation, the moveable cart may be positioned such that the first end is adjacent to the objects to be moved. The robotic manipulator may then be mounted adjacent to the first segment such that, during operation, the robotic manipulator may extend over the first segment of the horizontal conveyor to pick up an object and then place the object on the first segment of the conveyor. Such an arrangement may involve less rotation of the robotic manipulator to place the object on the horizontal conveyor, which may shorten an amount of time involved in placing the object on the conveyor. In addition, the first segment may provide locomotion to the object in a first direction, such as along the first end of the moveable cart. The second segment may be coupled to and vertically aligned with the first segment such that the locomotion of the first segment may cause the object to pass to the second segment. The second segment may then provide locomotion in a second direction away from the first segment, such as to the rear of the moveable cart, where the object may pass to another conveyor or be collected into a pile or a stack, for example.

Another example arrangement may include a horizontal conveyor provided with a first and second robotic manipulator on a moveable cart. The first and second robotic manipulators may allow for parallelization of the function of placing objects on the horizontal conveyor. For instance, the first robotic manipulator may pick up a first box. Then, while the first robotic manipulator is placing the first box on the horizontal conveyor, the second robotic manipulator may pick up a second box. Accordingly, while the second robotic manipulator is placing the second box on the horizontal conveyor, the first robotic manipulator may pick up a third box. The apparatus may repeat the process to unload additional boxes.

Further, certain arrangements of the horizontal conveyor and the first and second robotic manipulators with respect to one another may further improve efficiency in some circumstances. For instance, the first and second robotic manipulators may each be mounted to a first end of the moveable cart (e.g. an end near the objects to be moved). The horizontal conveyor may then extend from the first end to a second end of the moveable cart (e.g. the rear of the cart) between the first and second conveyors.

Alternatively, the first and second robotic manipulators may be mounted opposite one another to a member that is rotatably coupled to the moveable cart. Such an arrangement may allow the first robotic manipulator to act as a counterbalance to the second robotic manipulator. In operation, the first robotic manipulator may pick up a first object from a plurality of objects. Then, the member may rotate (such as by 180 degrees) which may align the first robotic member with the horizontal conveyor. Since the second robotic manipulator is mounted opposite of the first robotic manipulator, the same rotation may align the second robotic manipulator with the plurality of objects. The second robotic manipulator may then pick up a second objects from the plurality of objects. The member may then rotate a second time, which may align the first robotic manipulator with the plurality of objects and the second robotic manipulator with the horizontal conveyor.

In some embodiments, the horizontal conveyor may be divided into a first, a second, and a third segment. The first, second, and third segments may be arranged into a 'T' configuration. For instance, the first segment may extend between the first and second robotic manipulators from a first end of the moveable cart to a second end (e.g. along the center of the moveable cart). The second and third segments may then each extend along a respective portion of the first end and provide locomotion of objects to the first segment, but in opposite directions from one another. In operation, the first robotic manipulator may place objects on the second segment, and the second robotic manipulator may place objects on the third segment. Each of the second and third segments may then convey the objects to the first segment, which may convey the objects away from the second and third segments, such as to the second end of the moveable cart (i.e. the rear of the cart).

One example embodiment may involve a moveable cart and a conveyor configured to engage objects by suction. The conveyor may include a roller that is rotatably coupled to a frame. The roller may have a volume and a plurality of openings to the volume. A hose may connect the volume of the roller to an air pump. In operation, the air pump may apply a negative pressure to the roller by drawing more air out of the volume than can pass into the volume through the openings in the roller. The conveyor may also include a conveyor belt having openings that is wrapped around an exterior side of the roller. At least a portion of the plurality of openings in the conveyor belt may align with at least a portion of the plurality of openings of the roller so that the air pump may draw air through the aligned openings in the conveyor belt and the roller. The frame of the conveyor may be coupled to an actuator which may move the conveyor to bring the roller into contact with an object. Then, when the air pump applies a negative pressure to the roller, the conveyor may engage the contacted object by suction through the roller. The conveyor belt may then rotate to bring the engaged object onto the conveyor belt.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are apparatuses and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic apparatuses to move objects or perform other functions. In some embodiments, a robotic apparatus can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. The conveyor belt may include various types of conveyor systems, such as a roller conveyor system. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
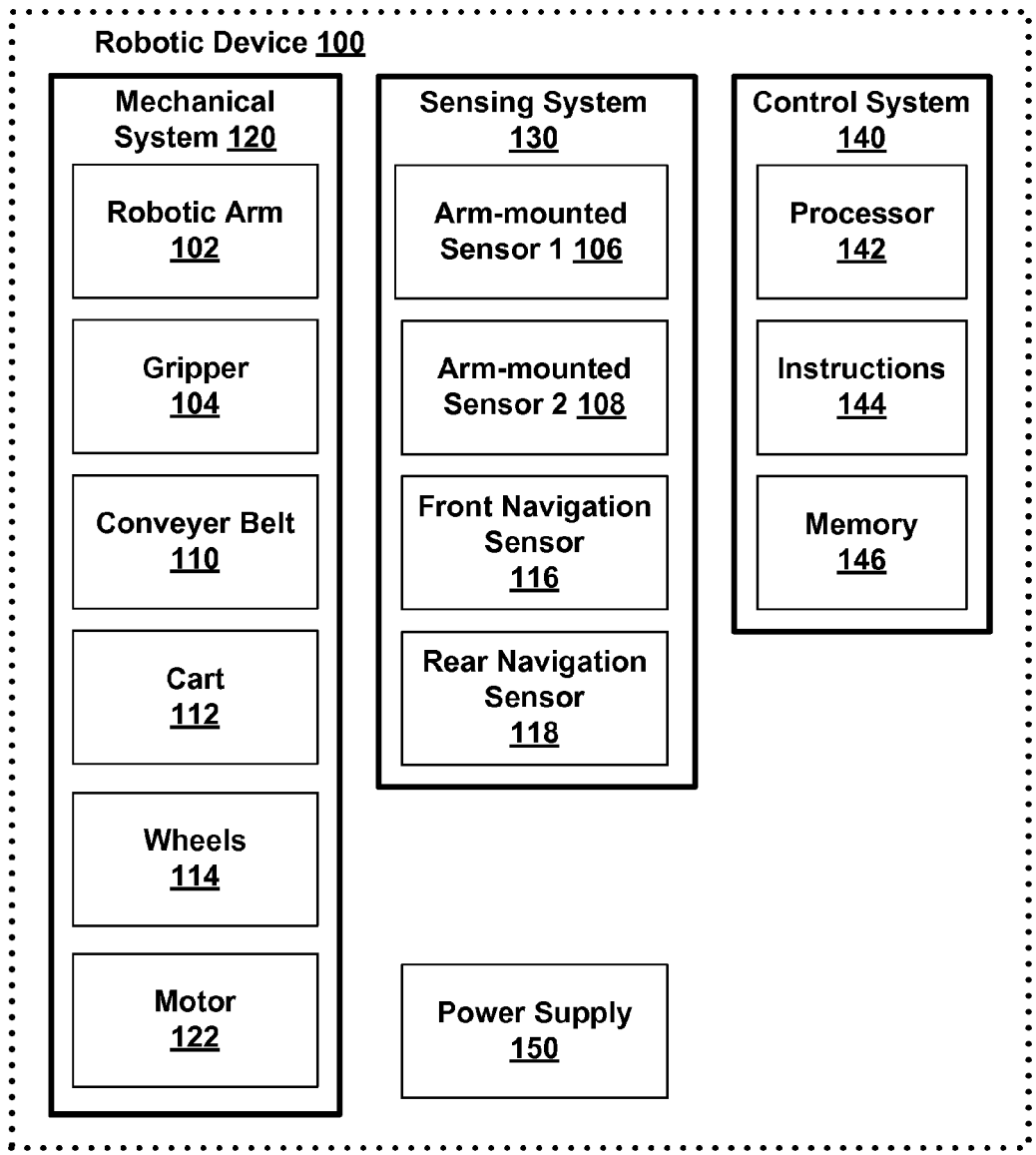
FIG. 1B is a functional block diagram illustrating a robotic apparatus, according to an example embodiment.

FIG. 1B is a functional block diagram illustrating a robotic apparatus 100, according to an example embodiment. The robotic apparatus 100 could include various subsystems such as a mechanical system 120, a sensing system 130, a control system 140, as well as a power supply 150. The robotic apparatus 100 may include more or fewer subsystems and each subsystem could include multiple elements. Further, each of the subsystems and elements of robotic apparatus 100 could be interconnected. Thus, one or more of the described functions of the robotic apparatus 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic apparatus 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the apparatus or could be in remote communication with the apparatus. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic apparatus can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic apparatus 100 may be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic apparatus 100 in a distributed fashion.

In some embodiments, memory 146 may contain instructions 144 (e.g., program logic) executable by the processor 142 to execute various functions of robotic apparatus 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
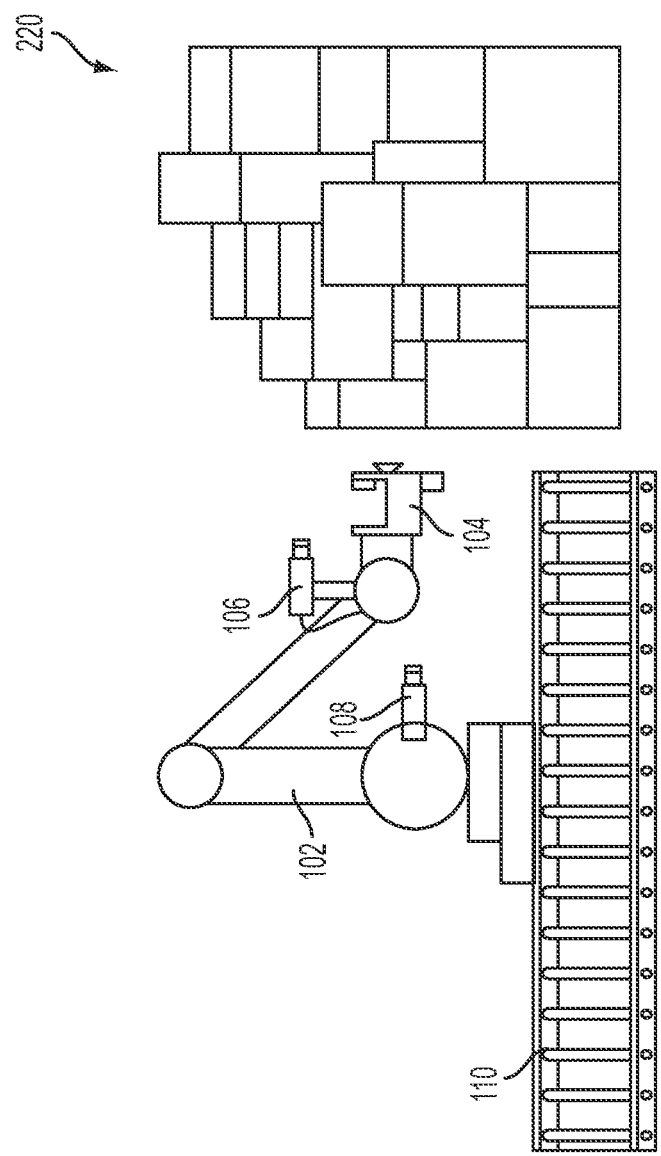
FIG. 2A shows a robotic arm and a stack of boxes, according to an example embodiment.

According to various embodiments, a perception guided robot is described. For instance, a robotic apparatus may utilize a combination of perception together with planning to guide the robot arm to pick up a box and place it where it needs to go. FIG. 2A illustrates part of the robotic apparatus from FIG. 1A with a stack of boxes, according to an example embodiment. As shown, the robotic apparatus may include a robotic arm 102 with a gripping component 104, sensors 106 and 108, and conveyer 110 as described above. In some examples, the robotic apparatus could be mounted on a holonomic cart as described with respect to FIG. 1A, could be mounted on a different type of movable apparatus, could be mounted on rails or tracks, or could be stationary. The robotic apparatus may be controlled to pick boxes from a stack of boxes 220 containing a heterogenous mix of shapes and sizes of boxes.

Figure 2B:
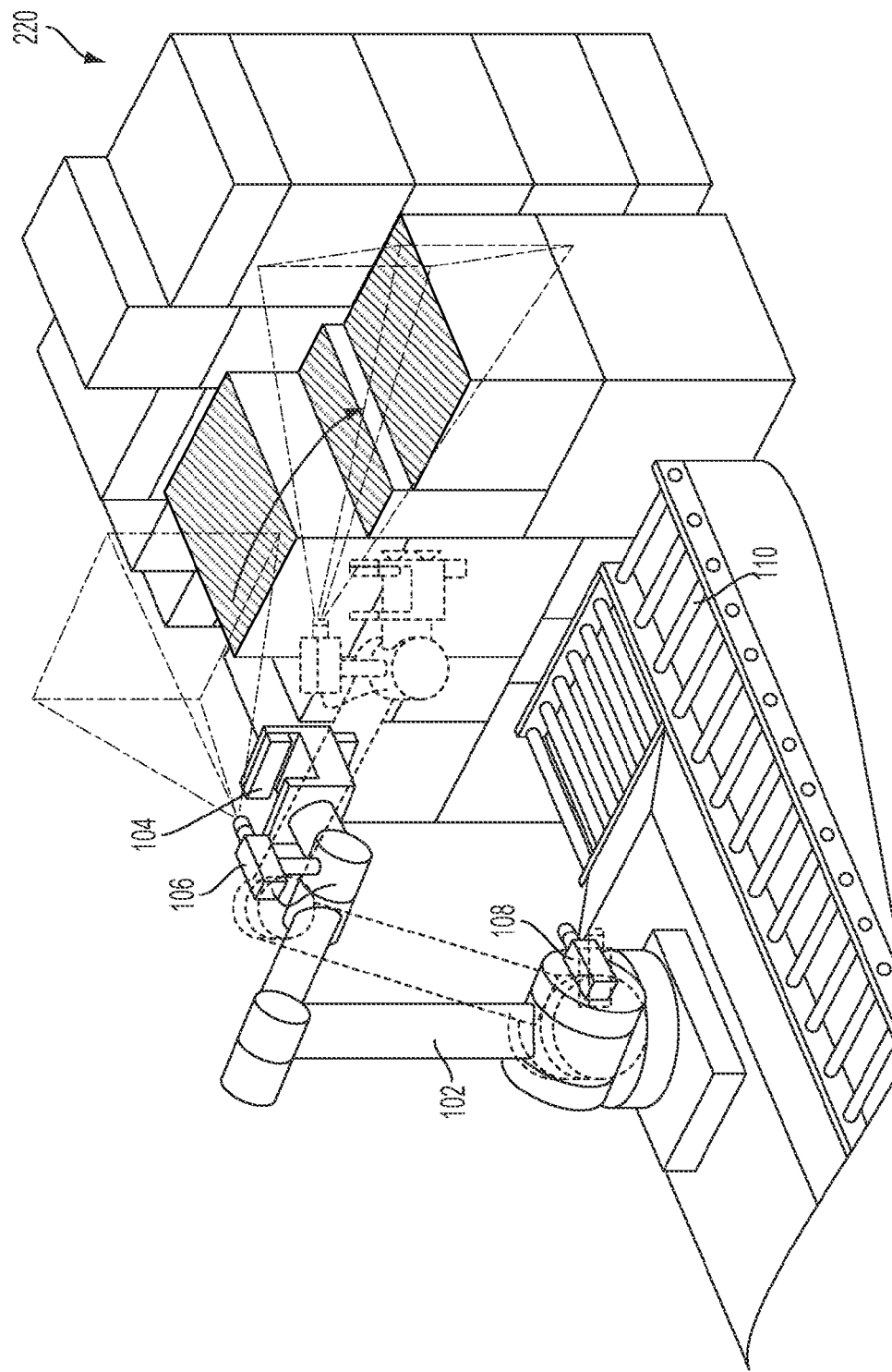
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic apparatus perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
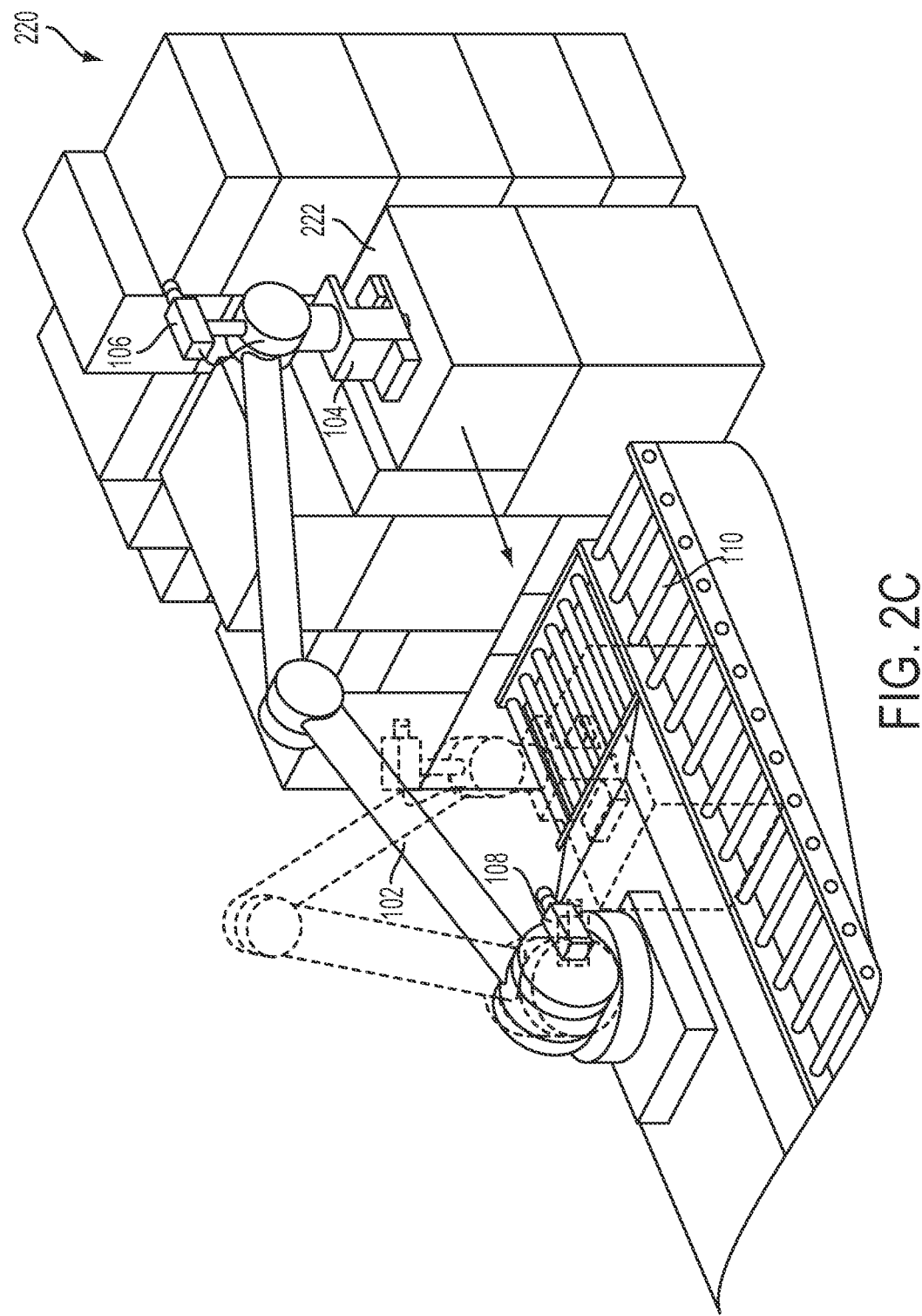
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic apparatus as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each apparatus to the other can be determined by each apparatus as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic apparatus may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow toward the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3:
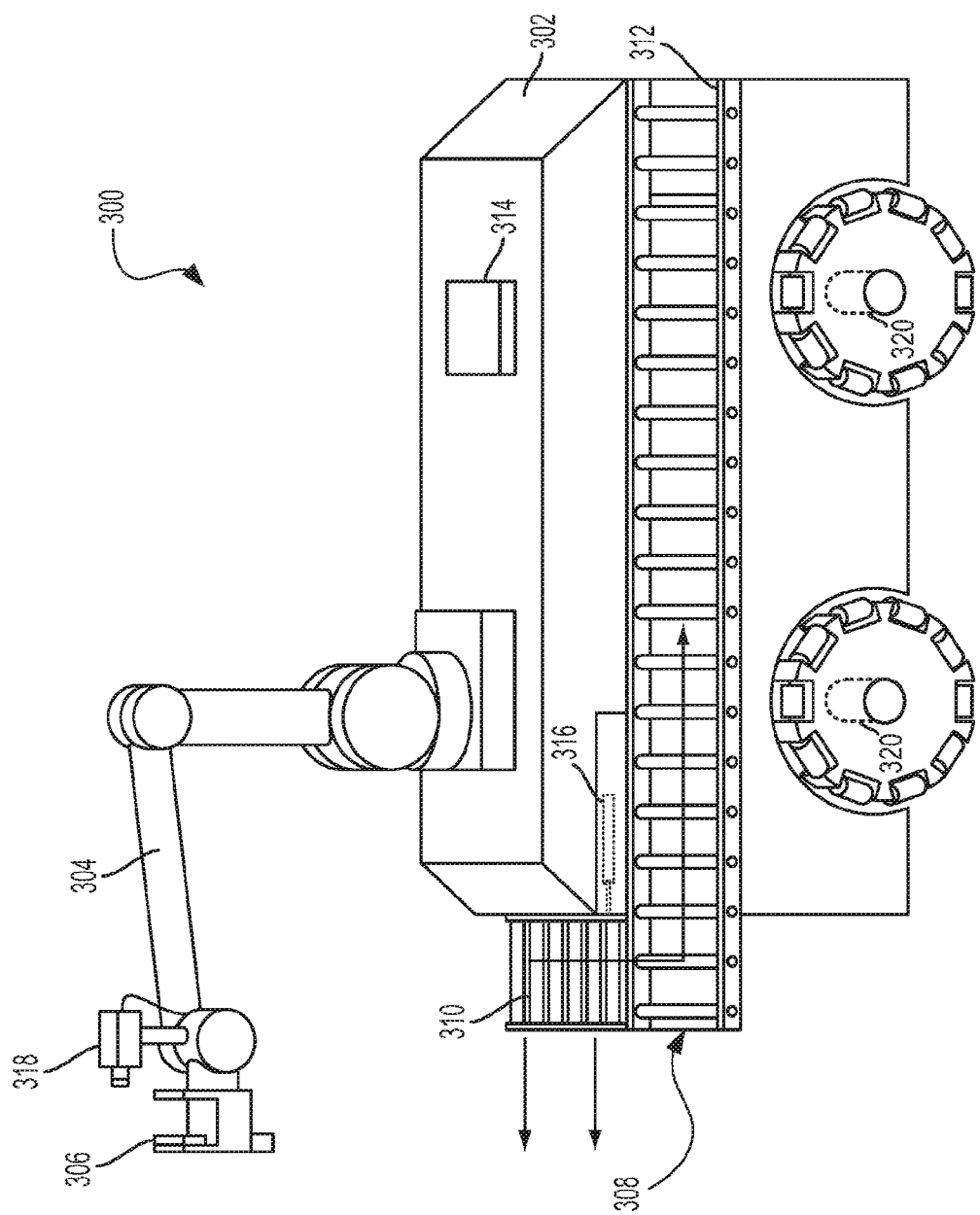
FIG. 3 shows an example robotic apparatus, according to an example embodiment.

FIG. 3 shows a robotic apparatus 300 according to an example embodiment. The robotic apparatus includes a moveable cart 302 having holonomic wheels. While the moveable cart is shown having holonomic wheels by way of example, the moveable cart 302 may have other types of wheels. For example, the moveable cart 302 may have wheels arranged to move the moveable cart 302 on rails.

A robotic arm 304 is mounted to the moveable cart 302 at a first end of the moveable cart 302 (which may be considered the front side of the moveable cart 302). While a robotic arm is shown by way of example, the robotic apparatus 300 may include any type of robotic manipulator that is suitable for placing objects onto a conveyor. The robotic arm 304 has a first end that is mounted to the moveable cart and a second end that has an end effector 306 (i.e. a grasper).

A horizontal conveyor 308 is provided on the moveable cart 302 in a wrap-around arrangement. The horizontal conveyor 308 includes a frame and a plurality of rollers rotatably coupled to the frame, as shown. A belt may drive the plurality of rollers which may cause the rollers to rotate and thereby provide locomotion. Such an arrangement may be referred to a roller-type conveyor. While a roller-type conveyor is shown by way of example, an example apparatus may include other types of conveyors, such as a belt-type conveyor.

Within examples, a horizontal conveyor may be arranged into a wrap-around configuration. In FIG. 3, a wrap-around arrangement of the horizontal conveyor 308 is formed by a first segment 310 and a second segment 312 that are orthogonal to one another. The first segment 310 extends along the front side near the robotic arm 304. This arrangement may reduce the amount of rotation of the robotic arm 304 involved in placing objects on the horizontal conveyor 308 because the robotic arm 304 may place objects at any point along the length of the first segment 310. For example, if the robotic arm 304 picks up an object near the front right corner of the moveable cart, the robotic arm 304 may then place the object on the right side of the first segment 310. Alternatively, in some circumstances, the robotic arm 304 may place an object on the second segment 312, such as if the object is near the far left side of the moveable cart 302.

As another example, a horizontal conveyor may be arranged into a "Y" configuration. A "Y" configuration may include a first segment that extends along a portion of a left side of the moveable cart and provides locomotion towards the rear of the cart. The "Y" configuration may also include a third segment that extends along a portion of a right side of the moveable cart and provides locomotion in parallel with the locomotion provided by the portion of the first segment. The first and third segments may each also extend towards and converge at a second segment. The second segment may then provide locomotion from the first and third conveyors towards the rear of the moveable cart. Such an arrangement may allow the robotic manipulator to place objects on the horizontal conveyor using less movement. For instance, the robotic manipulator may place objects to the right of the moveable cart on the third segment and place objects to the left of the moveable cart on the first segment. Then, in either case, locomotion provided by the first or third segment may move the object to the second segment.

Further, each of the first segment 310 and the second segment 312 provide locomotion. The first segment 310 may provide locomotion in a first direction, such as toward the second segment 312, as shown. The second segment 312 is coupled to and vertically aligned with the first segment 310 (i.e. at the same height), also as shown. This arrangement may allow continuous locomotion of objects from the first segment 310 to the second segment 312. The second segment 312 provides locomotion away from the first segment 310 (i.e. toward the rear of the cart 302). This arrangement may facilitate integration with a pre-existing unloading system, as commonly used in warehouses and factories. For instance, a particular unloading system may include a moveable conveyor that may facilitate moving objects from a loading dock to storage areas within a warehouse. By moving objects from a truck parked at the loading dock to the moveable conveyor system, for example, the robotic apparatus 300 may improve efficiency in transporting objects from the truck to a storage area within the warehouse (i.e. unloading the truck). Alternatively, the second segment 312 may lead to another apparatus for palletizing the objects. Many other examples of unloading system are possible.

Robotic apparatus 300 also includes a control system 314 configured to receive sensor data indicative of an environment containing a plurality of objects and then cause the robotic manipulator to place an object from the plurality of objects on the horizontal conveyor. The sensor data may include sensor scans of portions of the environment using sensors located on the robotic arm 304, on the moveable cart 302, and/or at other fixed or movable locations within the environment. For instance, the robotic arm 304 may move through the environment in order to allow a camera (e.g., a 3D depth sensor) to scan a group of object such as a stack of boxes as illustrated and described above with respect to FIG. 2B. In some examples, the robotic arm 304 may be programmed to move along certain motion paths (e.g., arcs or zigzags) in order to collect sensor data using one or more sensors mounted on the robotic arm. In further examples, scans from multiple sensors may be combined in order to create a single virtual representation of the environment. In some examples, the process of receiving sensor data from the one or more sensors and determining a virtual representation may be performed by the control system 314 of the robotic device 300 and/or by a remote control system.

Within examples, robotic apparatus 300 may include sensor(s) 318. Sensor(s) 318 may be attached the robotic arm 304 as shown. Further, sensor(s) 318 may be communicatively coupled to the control system 314 and configured to send data representing the environment to the control system 314.

As further shown in FIG. 3, the robotic apparatus 300 may further include an actuator 316, such as an electric, hydraulic, or pneumatic motor, that is coupled between the moveable cart 302 and the first segment 310. In some arrangements, the actuator 316 may be coupled to the frame of the conveyor. The actuator 316 may be configured to extend the first segment 310 away from the front of the moveable cart 302 and also to retract the first segment 310 back toward the moveable cart 302. Such a configuration may reduce the amount of movement involved in the robotic arm 304 placing objects on the first segment 310. For instance, when the robotic arm 304 is picking up an object near the limit of its range, the first segment 310 may extend away from the moveable cart to reduce the distance that the end effector 306 moves back toward the moveable cart 302 to place the object on the first segment 312.

In some embodiments, robotic apparatus 300 may include a drive system 320 coupled to the moveable cart 302. The drive system 320 may include, for example, one or more motors configured to drive one or more wheels of the moveable cart 302 (e.g. the holonomic wheels shown in FIG. 3). Control system 314 may be configured to cause the drive system to move the cart 302 within the environment. For instance, control system 314 may cause the drive system 320 to move the moveable cart 302 to objects such that the robotic arm 304 is within range of picking up the objects.

Robotic manipulators, such as the robotic arm 304 in FIG. 3, may have a range in which the robotic manipulator may manipulate objects. In some circumstances, such as with robotic arm 304, the range may be proportional to the distance between the first end and the second end (i.e. a "reach" of the robotic arm). A robotic apparatus may include additional features to extend the range of the robotic manipulator. For instance, a robotic apparatus may include a moveable base arranged to move horizontally relative to the moveable cart. Alternatively, a robotic apparatus may include a vertical support arranged such that the robotic manipulator may move up and down the vertical support and thereby extend its range.

In some embodiments, the robotic apparatus may include an anchor. The anchor may include, for example, one or more skids. One or more actuators may be coupled between the moveable cart and the anchor. A control system may cause the actuator to extend the skid downwards to contact the ground. Such an extension of the anchor may increase a coefficient of friction between the ground and the moveable cart. In an example, the extension may cause one or more of the wheels of the moveable cart to lift away from the ground. The control system may be configured to cause the actuator to extend the anchor downwards to contact the ground while the robotic manipulator is placing an object on the conveyor. Then, when the object is on the conveyor, the control system may be configured to cause the actuator to retract the anchor away from the ground. Such a configuration may prevent substantial movement of the moveable cart relative to the ground that may be result from a shifting of a center of gravity of the moveable cart that may be caused by movement of the robotic manipulator.

Within examples, the moveable cart may be divided along a length of the moveable cart into a first section and a second section. The first section may be pivotably coupled to the second section. The first section and the second section may each have one or more respective wheels. For instance, the first section may have two wheels coupled in parallel towards the front of the holonomic cart and the second section may have two wheels coupled in parallel towards the rear of the cart. In some circumstances, this arrangement may allow the wheels of the moveable cart to maintain contact with the ground that is relatively more consistent. For instance, the ground may be uneven. Then, when the moveable cart moves across the uneven ground, the second section may pivot relative to the first section. In addition, such an arrangement may assist in distributing weight relatively more evenly across the moveable cart.

Figure 4:
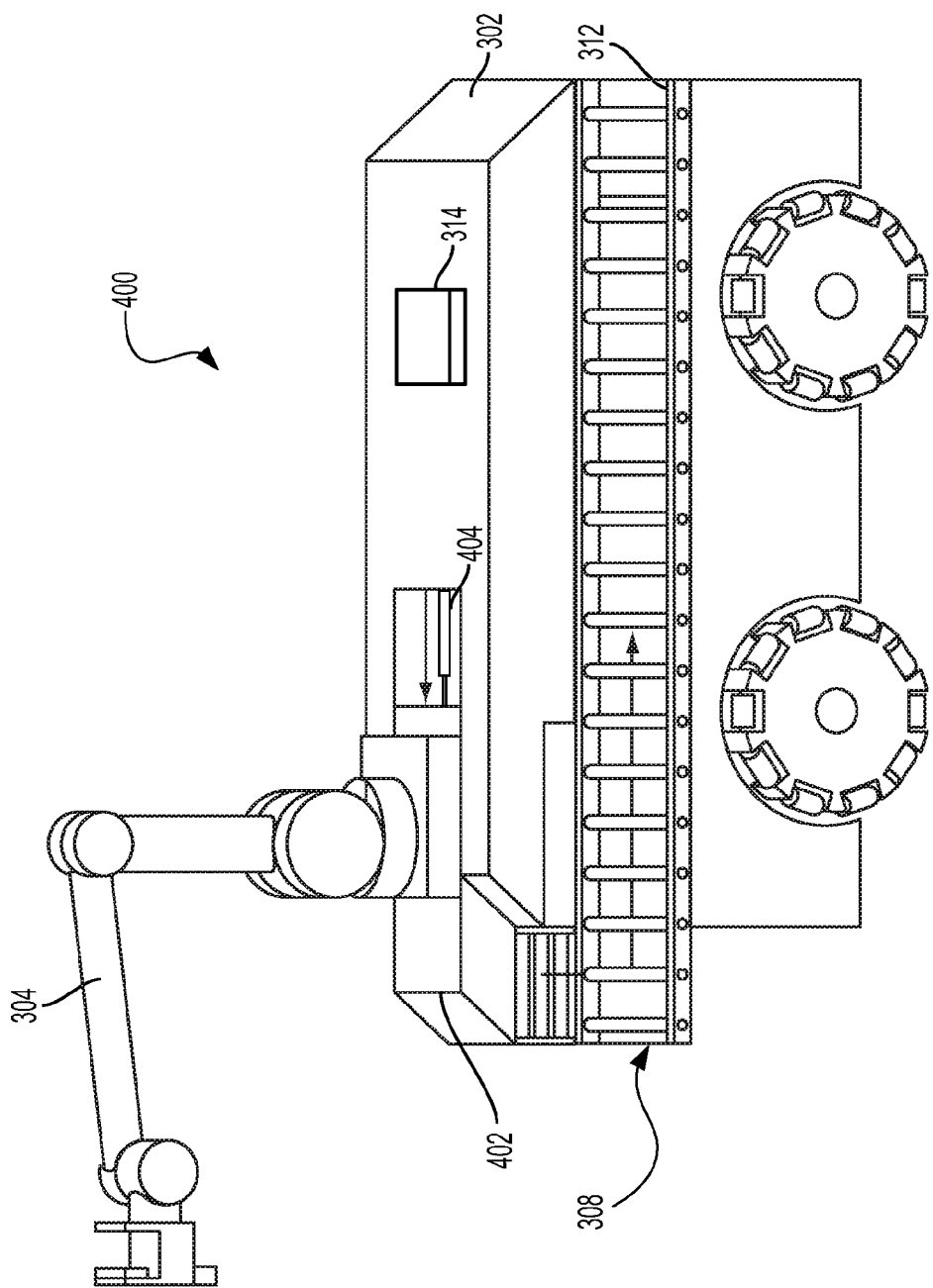
FIG. 4 shows another example robotic apparatus, according to an example embodiment.

FIG. 4 shows a robotic apparatus 400 according to an example embodiment. Robotic apparatus 400 includes moveable cart 302, robotic arm 304, horizontal conveyor 308, and control system 314. Robotic arm 302 is coupled to a moveable base 402. Moveable base 402 is provided on the top surface of moveable cart 302. An actuator 404 is coupled between the moveable base 402 and the moveable cart 302. Control system 314 may cause actuator 404 to move the moveable base 402 horizontally relative to the moveable cart 302. For instance, actuator 404 may slide the moveable base 402 backwards and forwards relative to the moveable cart 302, as shown. This arrangement may increase an effective range of the robotic arm 302 (where the effective range is the range of the robotic arm 302 combined with a range of movement of the moveable base 402). Alternatively, actuator 404 may be configured to move the moveable base 402 backwards, forwards, to the left, and to the right relative to the moveable cart. This arrangement may further extend the effective range of the robotic arm 302 in additional directions.

Figure 5:
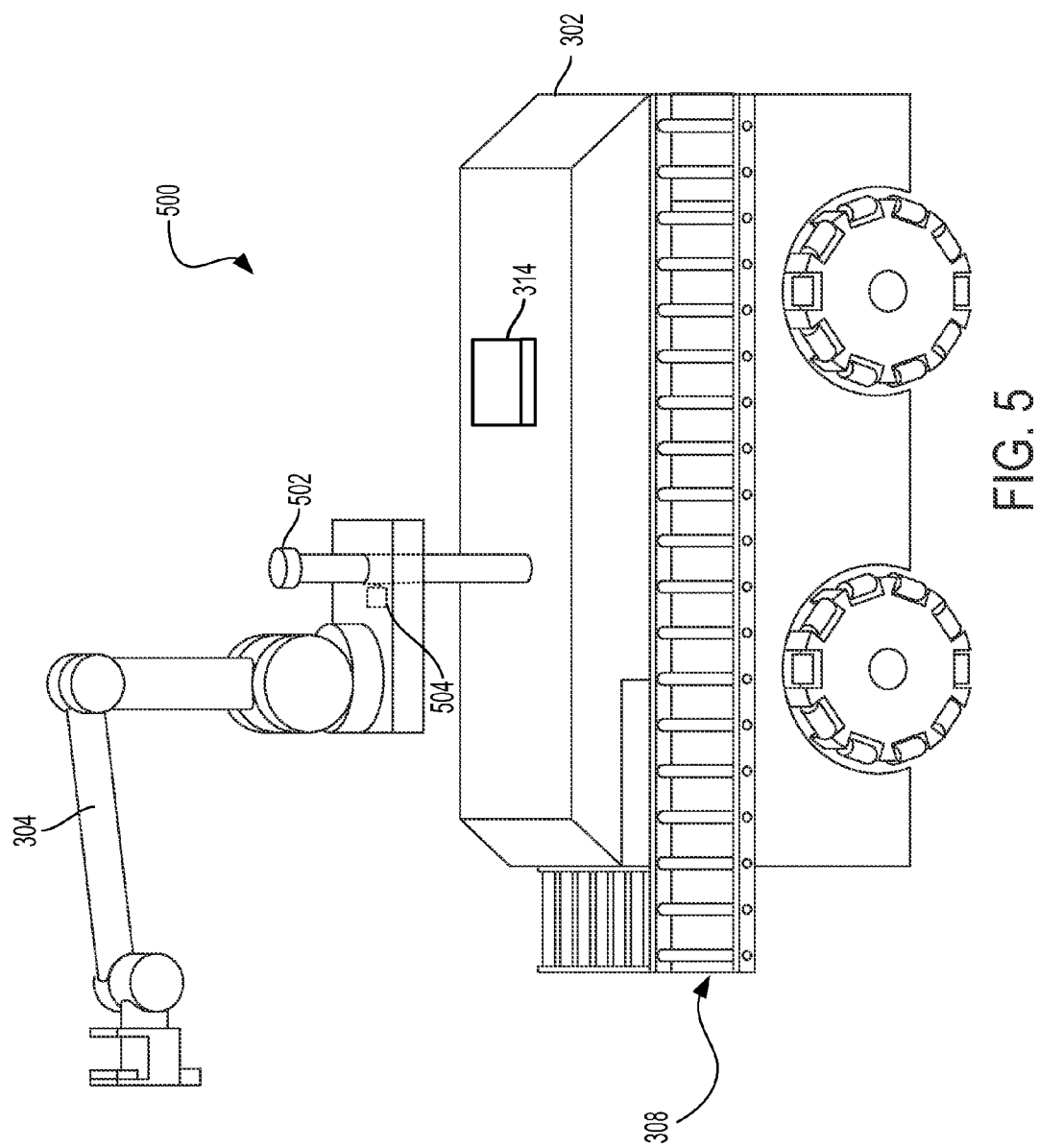
FIG. 5 shows yet another example robotic apparatus, according to an example embodiment.

FIG. 5 shows a robotic apparatus 500 according to an example embodiment. Robotic apparatus 500 includes moveable cart 302, robotic arm 304, horizontal conveyor 308, and control system 314. Robotic arm 302 is coupled to a vertical support 502. The vertical support 502 is provided on a top surface of moveable cart 302. In some embodiments, vertical support 502 may be a pole, as shown. An actuator 504 is coupled between the vertical support 502 and the moveable cart 302. Control system 314 may cause actuator 504 to move the robotic arm 304 vertically relative to the moveable cart 302. For instance, actuator 504 may slide the robotic arm 304 up and down along the vertical support 502. This arrangement may extend an effective range of the robotic arm 304 (where the effective range is the range of the robotic arm 304 combined with a range of movement along the vertical support 502) by allowing the robotic arm 304 to reach higher objects.

Figure 6:
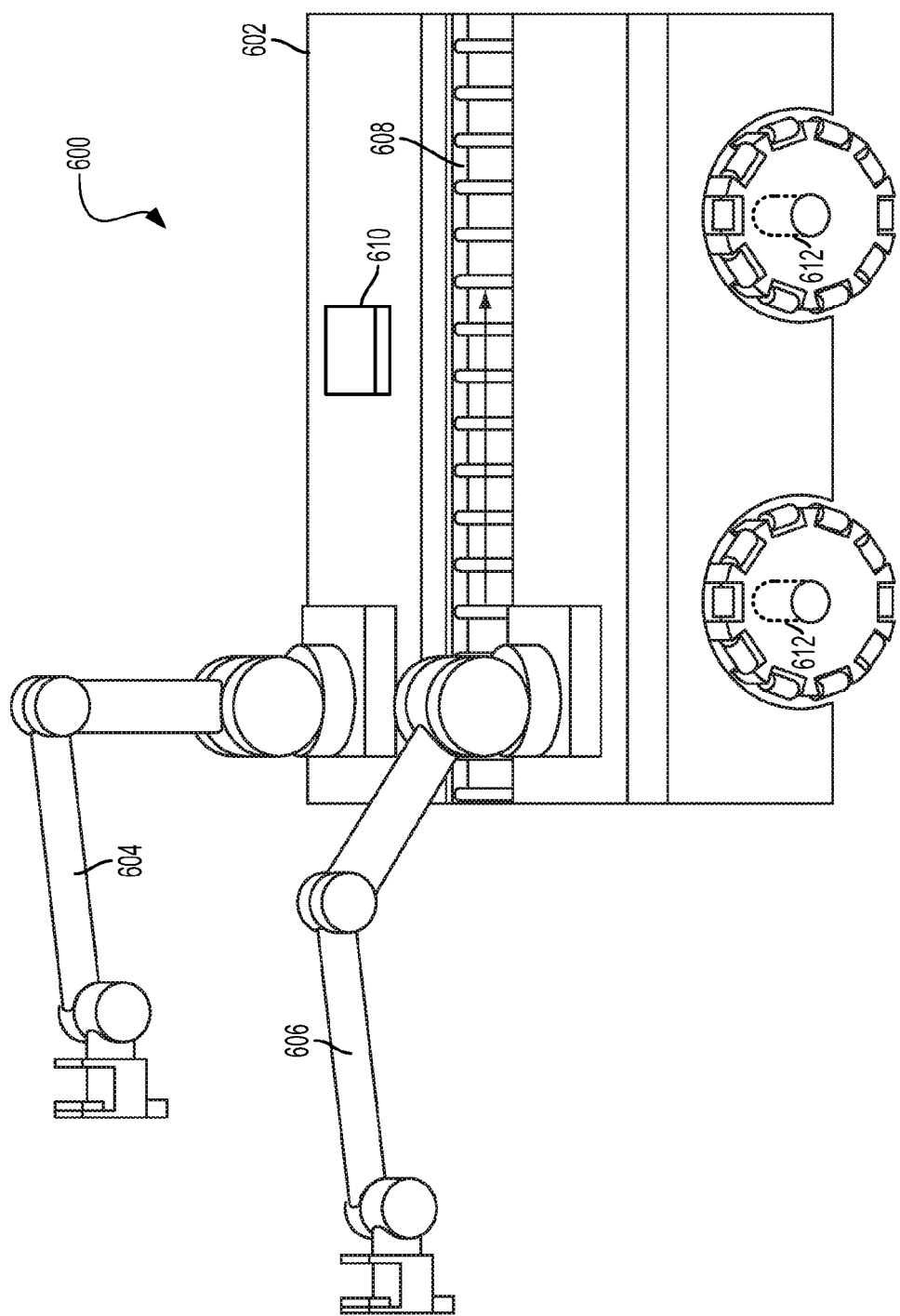
FIG. 6 shows another example robotic apparatus, according to an example embodiment.

FIG. 6 shows a robotic apparatus 600 according to an example embodiment. The robotic apparatus 600 includes a moveable cart 602 having holonomic wheels. A first robotic arm 604 is mounted to the moveable cart 602 at a first end of the moveable cart 602 (which may be considered the front-left corner of the moveable cart 602). A second robotic arm 606 is mounted to the moveable cart 602 at the first end of the moveable cart 602 opposite the first robotic arm 604 (which may be considered the front-right corner of the moveable cart 602). The first robotic arm 604 and the second robotic arm 606 each have a first end that is mounted to the moveable cart and a second end that has an end effector. This arrangement may allow for a relatively larger effective range to the left and right of the moveable cart 602 in which objects may be picked up by either the first robotic arm 604 or the second robotic arm 606. This arrangement may also reduce the amount of movement involved placing objects on a conveyor. For instance, the second robotic arm 606 may pick up objects that are located toward the front-right corner of the moveable cart 602 which may involve less movement relative to a robotic arm that is mounted in the center or on the left side of the moveable cart 602 picking up the same objects.

A horizontal conveyor 608 is provided on the moveable cart 602. The horizontal conveyor 608 includes a frame and a plurality of rollers rotatably coupled to the frame, as shown. The horizontal conveyor 608 extends from the first end of the moveable cart 602 to a second end (i.e. a length of the moveable cart 602). Alternatively, the horizontal conveyor 608 may extend for a portion of the length of the moveable cart 602. Within examples, the horizontal conveyor 608 may extend beyond the length of the moveable cart 602. The horizontal conveyor 608 is provided between the first robotic arm 604 and the second robotic arm 608. This arrangement may allow for both the first robotic arm 604 and the second robotic arm 606 to place objects on the horizontal conveyor.

Further, the horizontal conveyor 608 provides locomotion in a first direction (i.e. toward the rear of the moveable cart 602). By providing locomotion toward the rear of the cart, this arrangement may facilitate integration with pre-existing unloading systems that may be commonly used in warehouses and factories, among other locations, as noted above.

Robotic apparatus 600 also includes a control system 610 configured to receive sensor data indicative of an environment containing a plurality of objects. As noted above, the sensor data may include sensor scans of portions of the environment. The sensors may located on the first robotic arm 604, the second robotic arm 606, on the moveable cart 602, and/or at other fixed or movable locations within the environment. In some embodiments, the process of receiving sensor data from the one or more sensors may be performed by the control system 610 of the robotic device 600 and/or by a remote control system.

Control system 610 is also configured to cause the first robotic manipulator to place an first object from the plurality of objects on the conveyor, and to cause the second robotic manipulator to place an second object from the plurality of objects on the conveyor. In some embodiments, the first robotic arm 604 and the second robotic arm 606 may alternate actions involved in placing objects on the horizontal conveyor 608, which may improve efficiency in some circumstances. For instance, the control system 610 may cause the second robotic arm 606 to pick up the second object while the first robotic manipulator 604 is placing the first object on the horizontal conveyor 608; and then cause the first robotic manipulator 604 to pick up a third object while the first robotic manipulator 604 is placing the second object on the horizontal conveyor 608. The first robotic arm 604 and the second robotic arm 606 may continue to alternate actions to pick up additional objects. Such alternating of object placement may improve efficiency of object movement, such as box unloading, for example.

In some embodiments, robotic apparatus 600 may also include a drive system 612. The control system 610 may be configured to cause the drive system 612 to move the moveable cart 602 based on sensor data. For instance, the control system 610 may be configured to receive data indicating that the first object is out of the range of the first robotic arm 604, receive data, for one or more objects in the environment, indicating one or more respective distances to the one or more objects, determine a path to the first object based on the data indicating one or more respective distances to the one or more objects, and cause the holonomic drive system 612 to move the moveable cart 602 toward the first object based on the determined path.

In some embodiments, robotic apparatus 600 may also include a drive system 612. The control system 610 may be configured to cause the drive system 612 to move the moveable cart 602 based on sensor data. For instance, the control system 610 may be configured to receive data indicating that the first object is out of the range of the first robotic arm 604, receive data, for one or more objects in the environment, indicating one or more respective distances to the one or more objects, determine a path to the first object based on the data indicating one or more respective distances to the one or more objects, and cause the holonomic drive system 612 to move the moveable cart 602 toward the first object based on the determined path.

Figure 7:
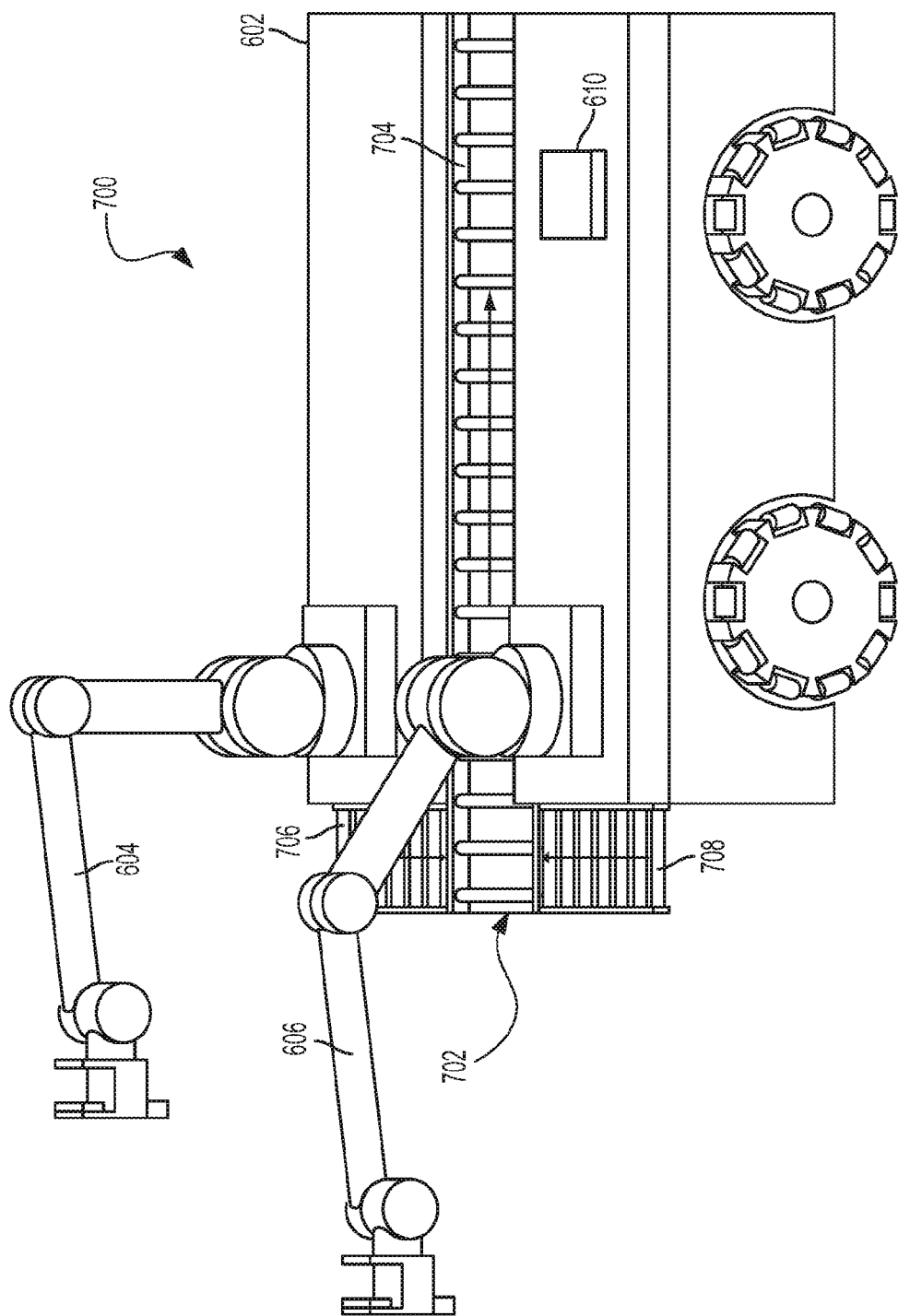
FIG. 7 shows another example robotic apparatus, according to an example embodiment.

FIG. 7 shows a robotic apparatus 700 according to an example embodiment. Robotic apparatus 700 includes moveable cart 602, first robotic arm 604, second robotic arm 606, control system 610, and a horizontal conveyor 702. First robotic arm 604 and second robotic arm 606 are mounted to moveable cart 602 opposite one another at one end (i.e. the front) of the moveable cart 602, as shown.

Horizontal conveyor 702 includes a first segment 704, a second segment 706, and a third segment 708 which are arranged into a "T" configuration. The horizontal conveyor 702 includes a frame and a plurality of rollers rotatably coupled to the frame, as shown. The first segment 704 extends along a top surface of the moveable cart 602 from a first side of the moveable cart 602 to a second side (i.e. a length of the moveable cart 602). Within examples, the first segment may extend further or less than the length of the moveable cart 602. The first segment 704 is provided between the first robotic arm 604 and the second robotic arm 606. While the first segment 704 is shown as centered on the surface of the moveable cart 602, other arrangements are possible as well. For instance, the first segment 704 may be offset to the right or left. Alternatively, the first segment 704 may be elevated above the surface of the moveable cart 602 by one or more vertical supports. The first segment 704 provides locomotion in a first direction (i.e. toward the rear of the moveable cart 602).

The second segment 706 and the third segment 708 each extend along a portion of the first side of the moveable cart 602. Further, the second segment 706 and the third segment 708 are each coupled to and vertically aligned with the first segment 704 such that objects on either the second segment 706 or the third segment 708 may move to the first segment 704. As shown, the second segment 706 provides locomotion to the first segment 704 and the third segment 708 provides locomotion to the first segment 704 in a direction opposite the locomotion of the second segment 706.

Figure 8:
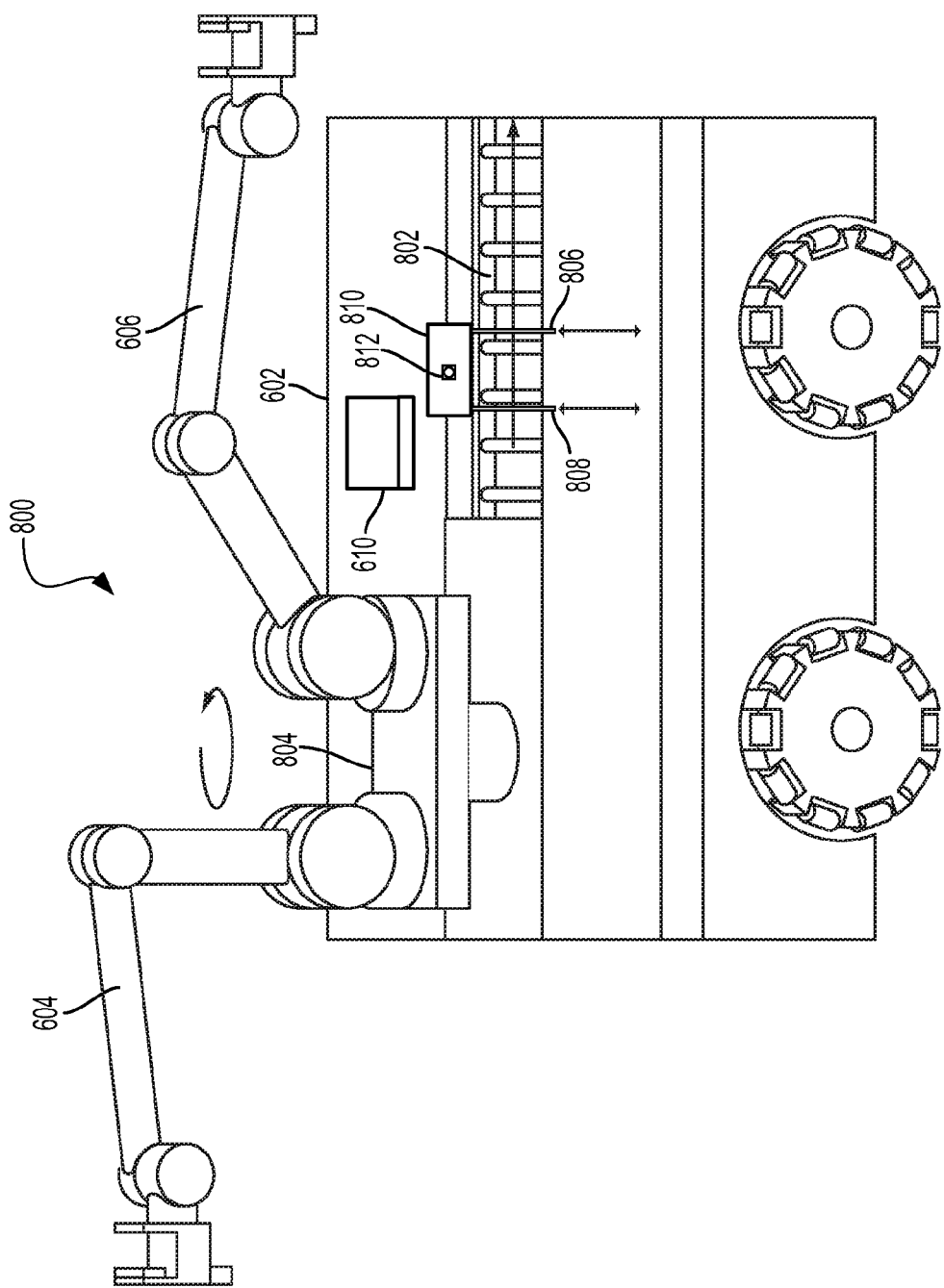
FIG. 8 shows yet another example robotic apparatus, according to an example embodiment.

FIG. 8 shows a robotic apparatus 800 according to an example embodiment. Robotic apparatus 800 includes moveable cart 602, first robotic arm 604, second robotic arm 606, control system 610, and a horizontal conveyor 802. The first robotic arm 604 and the second robotic arm 606 are mounted opposite one another to a member 804 that is rotatably coupled to a surface of the moveable cart 602, as shown. The member 804 may be a rigid structure capable of supporting the first robotic arm 604 and the second robotic arm 606. Such an arrangement of the first robotic arm 604 and the second robotic arm 606 may allow the first robotic arm 604 to fully or partially counterbalance the second robotic arm 606 and vice versa.

Such an arrangement may also increase efficiency in placing objects on the horizontal conveyor 802. For example, in operation, the first robotic arm 604 may pick up a first object from a plurality of objects. Then, the member 804 may rotate (such as by 180 degrees) to align the first robotic member with the horizontal conveyor 802. Then, since the second robotic arm 606 is mounted opposite of the first robotic arm 604, the rotation may align the second robotic arm 604 with the plurality of objects. The second robotic arm 606 may then pick up a second object from the plurality of objects. The member 804 may rotate a second time, which may align the first robotic arm 604 with the plurality of objects and the second robotic arm 606 with the horizontal conveyor 802. The control system 610 may be configured to cause one or more rotations of the member 804. For instance, the control system 610 may be configured to cause the 180 degree rotation noted above.

In some embodiments, one or more additional robotic arms may be distributed on the member with the first and second robotic arms. For instance, three robotic arms may be spaced 120 degrees apart from one another. Such embodiments may include one or more additional conveyors that may allow for parallelization of functions.

Accordingly, robotic apparatus 800 may be configured to orient boxes on a large side (e.g. the 24"×6" side of the example 24" by 6" by 6" box above). Such a configuration may include a first moveable member 806 and a second moveable member 808 arranged above the horizontal conveyor 802. The first moveable member 806 and the second moveable member 808 may be coupled to one or more actuators 810. The control system 610 may be configured to cause the one or more actuators 810 to move the first moveable member 806 and the second moveable member 808 over the horizontal conveyor 802 perpendicular to the direction of locomotion of the horizontal conveyor 810 (or a part thereof that is under the moveable members).

The configuration may also include a sensor 812, such as a depth sensor, that is arranged to generate data indicative of one or more dimensions of objects that are engaged by a robotic manipulator of the apparatus. The control system 610 may determine that an object engaged by the robotic manipulator has a vertical dimension that is greater than a threshold (e.g. 18") based on data from the sensor. Based on such a determination, the control system 610 may cause the one or more actuators 810 to move the first moveable member 806 and the second moveable member 808 over the horizontal conveyor 802. Then, when the object is placed on the horizontal conveyor 802, locomotion provided by the horizontal conveyor 802 may cause the object to contact the first moveable member 806. Such contact may cause the object to tip over in a direction opposite the direction of locomotion of the horizontal conveyor 802. The object may then contact the second moveable member 808 before contacting the horizontal conveyor 802, which may cause the object to contact the horizontal conveyor 802 with relatively less force. The control system 610 may also be configured to cause the one or more actuators 810 to move the first moveable member 806 and the second moveable member 808 such that the first moveable member 806 and the second moveable member 808 do not intersect objects moving along the horizontal conveyor 802.

Figure 9:
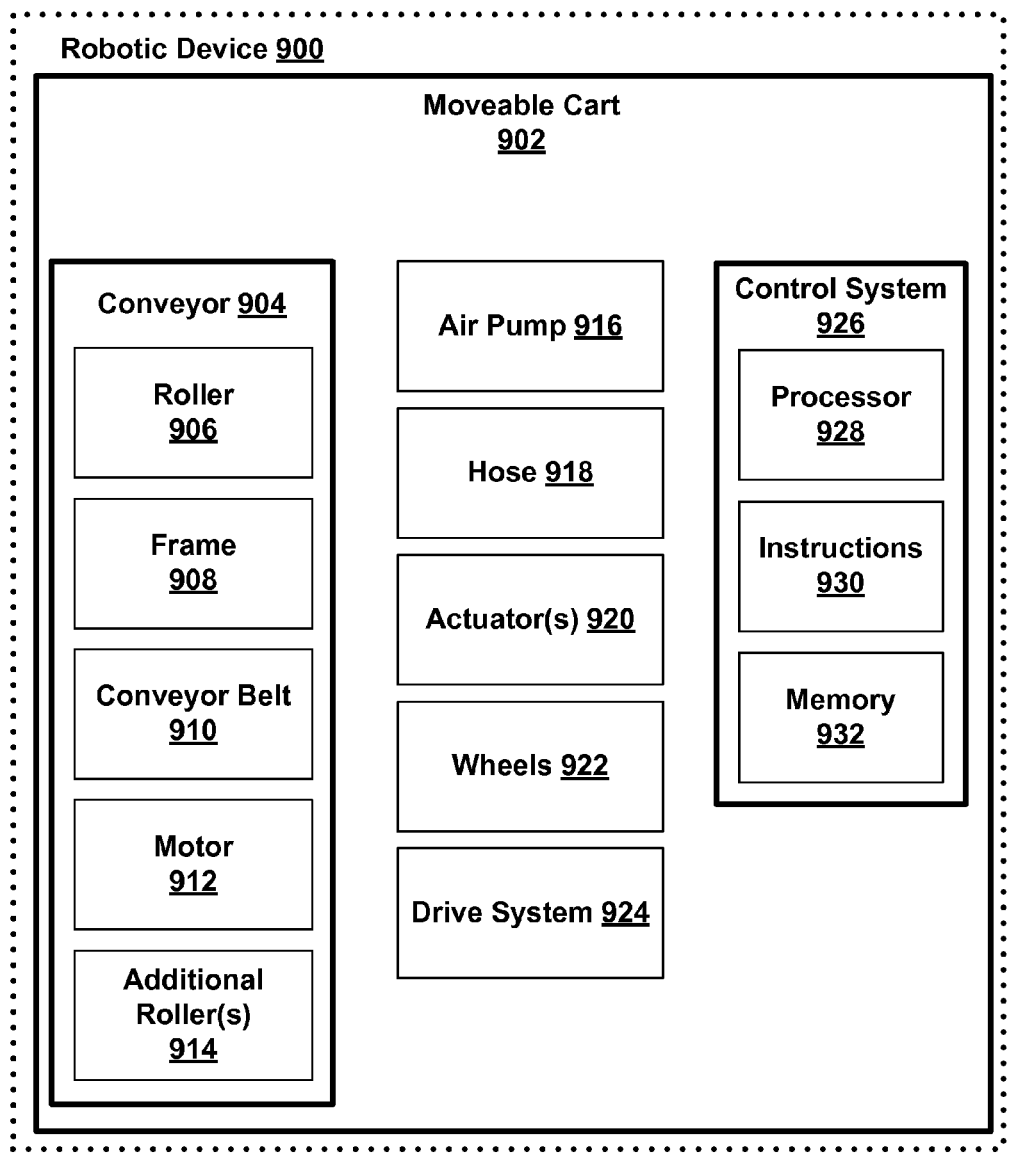
FIG. 9 is a functional block diagram illustrating a robotic apparatus, according to an example embodiment.

FIG. 9 is a functional block diagram illustrating a robotic apparatus 900, according to an example embodiment. Robotic apparatus 900 includes a conveyor 904 provided on a moveable cart 902. Conveyor 904 may engage objects by suction and then rotate to place the objects on the conveyor 904. The moveable cart 902 may have one or more wheels 922 coupled to a drive system 924.

Conveyor 904 provided on the moveable cart 902 may include various components that create suction through openings in a roller 906. For instance, the robotic apparatus 900 may include an air pump 916 that is coupled to a volume of the roller 906 via a hose 918. The air pump 916 is configured to draw air through the openings in the roller 906, through the volume of the roller 906, and out of the hose 918 to create suction at the openings in the roller 906. The hose 918 may be coupled to the roller 906 at one end of the roller 906, such that the coupling of the hose 918 to the roller 906 forms a portion of the coupling of the roller 906 to the frame 908. This arrangement may allow rotation of the roller 906 while the hose 918 is coupled to the roller 906.

The roller 906 may be rotatably coupled to a frame 908 at each end of the roller 906. The conveyor 904 may also include one or more additional rollers 914 rotatably coupled to the frame 908. One end of the frame 908 may be coupled to the moveable cart 902. The roller 906 may be coupled to an end of the frame 908 opposite the end of the frame 908 that is coupled to the moveable cart 902 such that the roller 906 is positioned at a distance from the moveable cart (i.e. a length of the frame or a portion thereof). This arrangement may facilitate engaging objects by suction.

Robotic apparatus 900 may also include a conveyor belt 910 that is wrapped around the roller 906. The conveyor belt 910 may also be wrapped around the one or more additional rollers 914. A particular roller of the one or more additional rollers 914 may be coupled to a motor 912 that causes the particular roller to rotate and thereby turn the conveyor belt 910. The conveyor belt 910 may have openings that align with openings in the roller 906 such that air may be drawn in by the air pump 916 through the openings in both the conveyor belt 910 and the roller 906.

Robotic apparatus 900 may also include one or more actuators 920 coupled between the moveable cart 902 and the frame 908. The actuators 920 may tilt the conveyor 904 up and down to allow the conveyor 904 to contact with objects that are at varying heights from the ground. In some embodiments, the one or more actuators 920 may be arranged to rotate the conveyor 902 to allow the conveyor 904 to contact objects that are toward either side of the moveable cart 902. Other arrangements are possible as well.

Robotic apparatus 900 may also include a control system 926 that may include a processor 926, instructions 928, and memory 930. The control system 926 may be configured to perform functions. For instance, the control system 926 may receive sensor data indicating an environment containing a plurality of objects. The control system 926 may then cause the actuators 920 to bring the conveyor belt 910 in contact with an object from the plurality of objects. After the conveyor belt 910 is in contact with the object, the control system 926 may cause the air pump 916 to apply a negative pressure to the volume of the roller 906 to engage the object by suction, and then cause the conveyor belt 910 to rotate around the roller 906 toward the moveable cart 902 to place the object on the conveyor belt 910.

In some embodiments, after the object is engaged by suction and before causing the conveyor belt 910 to rotate to place the object on the conveyor 904, the control system 926 may cause robotic apparatus 900 to pull the object toward the moveable cart 902 which may in turn expose an edge of the object. For instance, the control system 926 may be further configured to cause the actuators 9120 to tilt the frame 908 of the conveyor 904 upwards. When the object is stacked on another object in a stack, such an upwards tilt may pull the object which may expose an edge of the object relative to other object. The control system 926 may then cause the actuators 920 to move the conveyor belt 910 under the exposed edge. Alternatively, the moveable cart 902 may move toward the stack which may position the conveyor belt 910 under the exposed edge.

Within examples, the control system 926 may receive sensor data indicating that the object is placed on the conveyor 904 (i.e. the conveyor belt 910) and then cause the air pump 916 to release the negative pressure of the volume of the roller 906. Once the object is on the conveyor 906, engagement of the object by suction may no longer be needed or desired, so the control system 924 may disengage the air pump 916, which may release the negative pressure in the roller 906. The sensor data may be received from a belt scale, for example, that may be configured to weigh objects on the conveyor belt 912.

Figure 10:
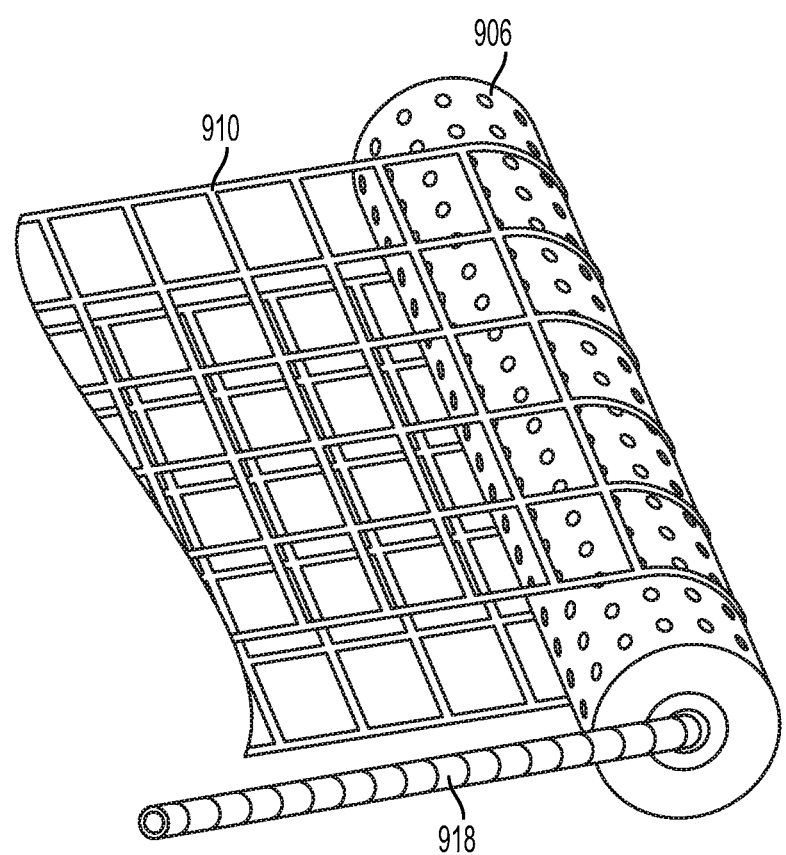
FIG. 10 shows features of an example robotic apparatus, according to an example embodiment.

FIG. 10 shows a portion of robotic system 900 that includes roller 906 and conveyor belt 910 of conveyor 904. Roller 906 has a plurality of holes into its volume, as shown. Further, conveyor belt 910 is wrapped around roller 910. Hose 918 is connected to the volume of roller 906.

Figure 11D:
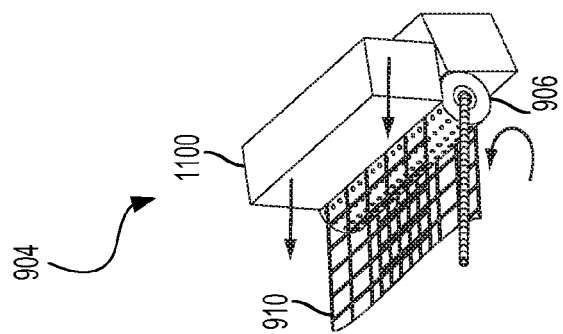
FIGS. 11A-11D show an example sequence of placing a box on a conveyor, as may be performed by an example robotic apparatus.
Figure 11C:
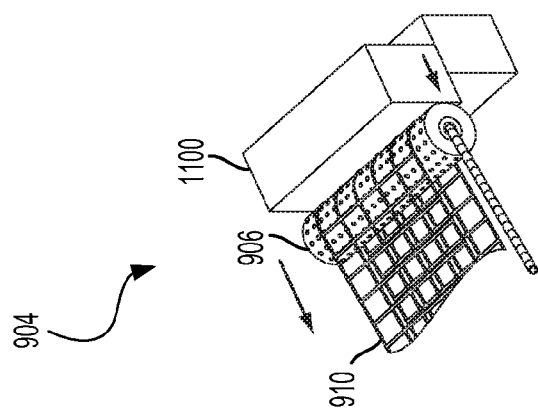
Figure 11B:
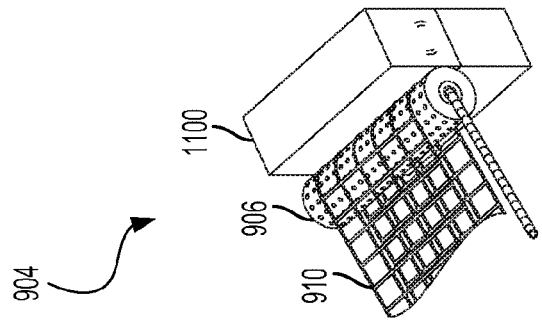
Figure 11A:
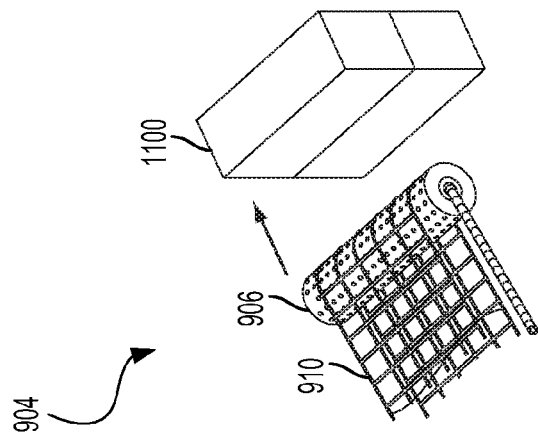

FIGS. 11A-11D shows a sequence of functions performed by the robotic apparatus 900 to place a box 1100 on the conveyor 904. In FIG. 11A, the control system 926 causes the conveyor belt 910 to contact a box 1100 in a stack of boxes. Then, in FIG. 11B, the control system 916 causes the air pump 916 to create a negative pressure in the roller 906, which may engage the box 1100 by suction. In FIG. 11C, the robotic apparatus 900 pulls the box 1100 to expose an edge of the box 1100 from the stack of boxes. Then, in FIG. 11D, the conveyor 904 is then moved under the exposed edge of the box 1100 and the conveyor belt 910 is rotated to place the box 1100 on the conveyor 904.

Some objects, such as boxes, may be relatively less stable in certain orientations. For instance, a box that measures 24" by 6" by 6" may be relatively less stable when placed on a side that measures 6" by 6" (i.e. a small side) than if places on a side that measures 24" by 6" (i.e. a large side) because the box has a relatively higher center of gravity in that orientation. Further, when such a box is placed on a conveyor with the small side down, locomotion provided by the conveyor may exert a force on the box that may cause the box to tip over. In some circumstances, tipping over may cause the box may fall off of the conveyor. While, in some cases, a control system may be configured to cause a robotic manipulator to place such boxes on a large side (e.g. the 24" by 6" side), such a configuration may slow placing objects on the conveyor because the configuration may involve additional movement (e.g. rotation). Moreover, in some circumstances, objects near the box may create difficulty in picking up the box in an orientation that facilitates placing the box on the conveyor in a certain orientation.

The functionality described in connection with the control systems described herein can be implemented as special-function and/or configured general-function hardware modules, portions of program code executed by a processor for achieving specific logical functions, determinations, and/or steps described in connection with the control systems described herein. Where used, program code can be stored on any type of computer-readable medium, for example, such as a storage device including a disk or hard drive.

In addition, functions performed by control systems described herein may represent circuitry that is wired to perform the specific logical functions in the process. Unless specifically indicated, functions may be executed out of order from that shown or discussed, including substantially concurrent execution of separately described functions, or even in reverse order in some examples, depending on the functionality involved, so long as the overall functionality of the described method is maintained.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A function that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. An apparatus comprising:
   a moveable cart;
   a conveyor provided on the moveable cart, wherein the conveyor comprises:
      a first segment providing locomotion in a first direction, and
      a second segment coupled to and vertically aligned with the first segment and providing locomotion in a second direction perpendicular to the first segment;
   a robotic manipulator having a first end mounted to the moveable cart and a second end having an end effector; and
   a control system configured to:
      receive sensor data indicative of an environment containing a plurality of objects; and
      cause the robotic manipulator to place an object from the plurality of objects on the conveyor.

2. The apparatus according to claim 1, wherein the first segment comprises a frame and a plurality of rollers rotatably coupled to the frame; wherein the apparatus further comprises an actuator coupled between the moveable cart and the frame, and
   wherein the control system is further configured to cause the actuator to extend the first segment away from the moveable cart.

3. The apparatus according to claim 1, wherein the moveable cart is a holonomic cart comprising at least one wheel having two degrees of freedom of movement.

4. The apparatus according to claim 3, wherein the holonomic cart further comprises a drive system coupled to the holonomic cart; and
   wherein the control system is further configured to cause the drive system to move the holonomic cart within the environment.

5. The apparatus according to claim 1, further comprising:
   a moveable base provided on a top surface of the moveable cart and coupled to the first end of the robotic manipulator;
   an actuator coupled between the moveable base and the moveable cart; and
   wherein the control system is further configured to cause the actuator to move the moveable base horizontally relative to the moveable cart.

6. The apparatus according to claim 1, further comprising:
   a vertical support coupled to the moveable cart;
   an actuator coupled between the vertical support and the first end of the robotic manipulator; and
   wherein the control system is further configured to cause the actuator to move the robotic manipulator vertically along the vertical support.

7. The apparatus according to claim 1, further comprising:
   a sensor attached to the robotic manipulator and communicatively coupled to the control system, wherein the control system is further configured to receive the sensor data from the sensor.

8. The apparatus according to claim 1, wherein the moveable cart has a front section having one more wheels and a rear section having one or more wheels, and wherein the front section is rotatably coupled to the rear section.

9. The apparatus according to claim 1, wherein one or more wheels of the moveable cart are in contact with a ground surface of the environment, and wherein the apparatus further comprises:
   an anchor;
   one or more actuators coupled between the anchor and the moveable cart; and wherein the control system is further configured to:
      cause the actuator to extend the anchor to contact the ground surface of the environment while the robotic manipulator is placing the object on the conveyor.

10. The apparatus according to claim 1, further comprising:
   a first moveable member positioned to a side of the conveyor and coupled to an actuator that is provided on the moveable cart;
   a second moveable member positioned to the side of the conveyor and coupled to the actuator that is provided on the moveable cart; and wherein the control system is further configured to:
      receive data indicating a vertical dimension of the object;
      determine the vertical dimension is greater than a threshold; and
      cause the actuator to move the first moveable member and the second moveable member over the conveyor such that the object is between the first moveable member and the second moveable member.

11. An apparatus comprising:
   a moveable cart;
   a conveyor provided on the moveable cart;
   a member rotatably coupled to a top surface of the moveable cart;
   a first robotic manipulator coupled to the member;
   a second robotic manipulator coupled to the member such that the second robotic manipulator is vertically aligned with and horizontally opposite of the first robotic manipulator; and
   a control system configured to:
      receive sensor data indicating an environment containing a plurality of objects;
      cause the first robotic manipulator to place a first object from the plurality of objects on the conveyor; and
      cause the second robotic manipulator to place a second object from the plurality of objects on the conveyor.

12. The apparatus according to claim 11, wherein the conveyor extends along the top surface of the moveable cart from a first side of the moveable cart to a second side of the moveable cart between the first robotic manipulator and the second robotic manipulator.

13. The apparatus according to claim 11, wherein the conveyor comprises:
   a first segment extending along the top surface of the moveable cart from a first side of the moveable cart to a second side of the moveable cart between the first robotic manipulator and the second robotic manipulator; and
   a second segment coupled to and vertically aligned with the first segment and extending along at least a portion of the first side.

14. The apparatus according to claim 13, wherein the second segment of the conveyor provides locomotion in a first direction toward the first segment, and wherein the first segment of the conveyor provides locomotion in a second direction away from the first segment.

15. The apparatus according to claim 11, wherein the conveyor comprises:
   a first segment extending along the top surface of the moveable cart from a first side of the moveable cart to a second side of the moveable cart between the first robotic manipulator and the second robotic manipulator;

a second segment coupled to and vertically aligned with the first segment and extending along a first portion of the first side; and a third segment coupled to and vertically aligned with the first segment and extending along a second portion of the first side.

16. The apparatus according to claim 15, wherein the first segment of the conveyor provides locomotion toward the second side of the moveable cart, wherein the second segment of the conveyor provides locomotion to the first segment of the conveyor, and wherein the third segment of the conveyor provides locomotion to the first segment of the conveyor in a direction opposite the locomotion of the second segment.

17. The apparatus of claim 15, wherein the control system is further configured to:
cause the second robotic manipulator to pick up the second object while the first robotic manipulator is placing the first object on the first segment of the conveyor; and
cause the first robotic manipulator to pick up a third object while the first robotic manipulator is placing the second object on the second segment of the conveyor.

18. The apparatus of claim 17, wherein the control system is further configured to:
cause the second robotic manipulator to pick up the second object while the first robotic manipulator is placing the first object on the conveyor; and
cause the first robotic manipulator to pick up a third object while the first robotic manipulator is placing the second object on the conveyor.

19. The apparatus according to claim 11, wherein the moveable cart comprises a holonomic drive system comprising at least one wheel having at least two degrees of freedom of movement, and
wherein the control system is further configured to:
receive data indicating that the first object is out of a range of the first robotic manipulator;
receive data, for one or more objects in the environment, indicating one or more respective distances to the one or more objects;
determine a path to the first object based on the data indicating one or more respective distances to the one or more objects; and
cause the holonomic drive system to move the moveable cart toward the first object based on the determined path.

20. The apparatus according to claim 11, further comprising an actuator coupled between the first segment of the conveyor and the moveable cart; and
wherein the control system is further configured to cause the actuator to tilt the conveyor toward an object of the plurality of objects.

21. An apparatus comprising:
a moveable cart;
a conveyor provided on the moveable cart, wherein the conveyor comprises:
a frame,
a roller rotatably coupled to the frame, wherein the roller comprises a volume and a plurality of openings to the volume,
an air pump,
a hose coupled between the volume of the roller and the air pump, and
a conveyor belt having a plurality of openings, wherein the conveyor belt wraps around an exterior side of the roller and at least a portion of the plurality of openings align with at least a portion of the plurality of openings of the roller;
an actuator coupled between the moveable cart and the frame of the conveyor; and
a control system configured to:
receive sensor data indicating an environment containing a plurality of objects;
cause the actuator to bring the conveyor belt in contact with an object from the plurality of objects;
cause the air pump to apply a negative pressure to the volume of the roller to engage the object by suction; and
cause the conveyor belt to rotate around the roller toward the moveable cart to place the object on the conveyor belt.

22. The apparatus according to claim 21, wherein the control system is further configured to:
receive sensor data indicating that the object is placed on the conveyor; and
cause the air pump to release the negative pressure of the volume of the roller.

23. The apparatus according to claim 21, wherein the control system is further configured to:
after the object is engaged by suction and before causing the conveyor belt to rotate to place the object on the conveyor, cause the actuator to move the frame of the conveyor towards the moveable cart.

* * * * *